United States Patent [19]
Gibbons

[11] 3,928,706
[45] Dec. 23, 1975

[54] WEAR-RESISTANT DECORATIVE LAMINATES AND METHODS FOR PRODUCING SAME

[75] Inventor: Harold Gibbons, Wokingham, England

[73] Assignee: Formica International Limited, London, England

[22] Filed: June 25, 1973

[21] Appl. No.: 373,308

[52] U.S. Cl. ............... 428/323; 156/228; 156/277; 156/288; 428/328; 428/331; 428/409
[51] Int. Cl.² ..................... B32B 5/16; B44F 1/00
[58] Field of Search ....... 161/162, 138, 413, 6, 156, 161/158, 79; 156/277, 228, 288; 428/323, 328, 329, 331, 409

[56] References Cited
UNITED STATES PATENTS

| | | | |
|---|---|---|---|
| 3,123,515 | 3/1964 | Barna | 161/162 |
| 3,135,643 | 6/1964 | Michl | 161/158 |
| 3,344,011 | 9/1967 | Goozner | 161/162 X |
| 3,445,327 | 5/1969 | Fuerst | 161/158 X |
| 3,525,664 | 8/1970 | Hale et al. | 161/162 |
| 3,787,229 | 1/1974 | Rudness | 161/162 X |

*Primary Examiner*—Lorraine T. Kendell
*Attorney, Agent, or Firm*—Fleit & Jacobson

[57] ABSTRACT

The invention provides a wear-resistant decorative laminate obtained by consolidating an assembly of (1) a core of thermosetting resin-impregnated sheets, (2) a coloured or printed thermosetting resin-impregnated fibrous sheet, (3) a wear-resistant layer containing a thermosetting resin, a finely divided water-insoluble mineral matter having a hardness of at least 7 and a finely divided fibrous cellulosic material, and (4) a thermosetting resin-impregnated α-cellulose paper overlay sheet. The laminates have a high degree of wear-resistance.

13 Claims, No Drawings

WEAR-RESISTANT DECORATIVE LAMINATES AND METHODS FOR PRODUCING SAME

This invention relates to wear-resistant decorative laminates and to methods for preparing the same.

With the ever-increasing use of decorative laminates as surfacing materials for furniture, walls, floors etc. the requirements that these materials must meet have become more and more exacting. One requirement that is almost universally necessary is that of wear-resistance whilst another of almost equal importance is that the materials should be available in a variety of surface appearances commonly designated glossy, semi-gloss and matt.

Commonly conventional decorative laminates comprise three distinct layers, namely a transparent outer wear surface layer comprising a thermosetting resin-impregnated alpha-cellulose paper sheet or overlay, an intermediate printed or coloured layer also impregnated with a thermosetting resin and an inner thermosetting resin impregnated core layer providing support for the decorative and wear layers. Whilst such laminates are satisfactory for normal use it is known that for certain areas of application, for example floors, the wear-resistance of these laminates is generally insufficient.

Many attempts have been made to provide decorative laminates having a higher degree of wear-resistance but such attempts have usually been accompanied by deleterious effects on one or more other properties of the laminate surface. For example, it has been proposed to incorporate in the resins used to impregnated the outer alpha-cellulose layer a mineral material such as silica; however, the use of such mineral-containing resin compositions often results in the formation of laminates having poor resistance to crazing. It has also been proposed to prepare wear-resistant decorative laminates by using a coating composition comprising a thermosetting resin, finely divided silica and finely divided fibrous cellulosic material in place of the thermosetting resin-impregnated overlay sheet; however, when a glossy surface laminate of this type is mechanically abraded to give a surface of reduced gloss, the resultant surface commonly exhibits a non-uniform or mottled appearance.

When decorative laminates are used on surfaces such as kitchen working surfaces, counter tops and floors it has become customary to apply them in a form in which light scatter is high. The provision of laminates in such a form may be achieved, for example, by the use of press-plates provided with a surface corresponding to that desired in the laminate. It is preferred, however, for economic reasons to prepare decorative laminates using one type of surface finished press-plate only, namely a mirror finish plate as such plates are relatively easy to maintain in satisfactory condition. The use of this type of plate leads to production of laminates from the press all having a glossy surface appearance. Surfaces of reduced gloss on the laminates are then provided by submitting the glossy surface laminates to a mechanical abrading process whereby the degree of reduced gloss desired is produced.

It is a primary object of this invention to provide decorative laminates having a high degree of wear-resistance and surfaces adapted for post-production treatment to modify the appearance thereof economically, satisfactorily and substantially uniformly.

According to my invention a decorative plastics laminate having a high-wear-resistance is the consolidated cured unitary structure obtained by the application of heat and pressure to a superimposed assembly consisting essentially of, in this order, (1) a core of thermosetting resin-impregnated fibrous sheets, (2) a coloured or printed decorative fibrous sheet impregnated with a thermosetting resin, (3) a wear-resistant layer consisting essentially of a thermosetting resin composition, a finely divided water-insoluble mineral matter having a hardness of at least 7 on the Mohs scale of hardness and a finely divided fibrous cellulosic material and (4) a thermosetting resin-impregnated alpha-cellulose paper overlay sheet.

The fibrous core sheets used in preparing the laminates of the present invention are preferably paper sheets and more preferably Kraft paper sheets. When such Kraft paper sheets are used I prefer that they should have a basis weight of between about 150 g.s.m. and 250 g.s.m. and more preferably should have a basis weight of about 200 g.s.m.

The thermosetting resin, preferably in the form of a varnish, used to impregnate such sheets may be an suitable resin known for such use but we prefer to use a phenol-formaldehyde resin. When using such resins we prefer to impregnate and dry the impregnated sheets, by methods known in the art, to a resin content of from about 25% to about 45% and more preferably to a resin content of about 30% based on the weight of resin solids in the impregnated sheet. The volatile content of the dried impregnated sheet is preferably between 5% and 10%, more preferably about 8%.

The decorative sheets are preferably fibrous sheets and more preferably are paper sheets which are either coloured or printed with a desired pattern. When the preferred paper sheets are employed, any suitable basis weight paper may be used to advantage, but we prefer to use papers of from about 80 g.s.m. to about 170 g.s.m. basis weight.

The alpha-cellulose paper used in the preparation of the thermosetting resin-impregnated overlay is suitably any such known for use in the production of conventional decorative plastics laminates; preferably it is a wet-strengthened alpha-cellulose paper having a basis weight of between about 15 g.s.m. and about 50 g.s.m. and more preferably it is of about 25 g.s.m. basis weight. In the impregnated and cured condition the overlay is substantially transparent.

The thermosetting resins used to impregnate the decorative paper sheet, the overlay and to form the wear-resistant layer may be the same or different and may be any thermosetting resin suitable for such purpose, for example, melamine-formaldehyde resins, melamine urea-formaldehyde resins, unsaturated polyester resins and amino-triazine modified alkyd resins may be employed. If different resins are used to impregnate the different layers or to provide the wear-resistant layer, care should be taken to ensure that the resins are compatible, that is the resins must be capable of forming strong coherent bonds with each other under the conditions used for processing and no deleterious reactions between the resins should occur. We prefer to use one type of resin for the purposes mentioned and more preferably to use a melamine-formaldehyde resin for these purposes.

The finely divided mineral materials useful in preparing the wear-resistant layer in the laminates of our invention are those natural or synthetic materials having a hardness of at least 7 on the Mohs scale of hardness. Examples of minerals found to give satisfactory results are quartz (Moh hardness of 7) and corundum (Moh hardness of 9) both of which are naturally occurring and fused aluminium oxide and carborundum (both of which have a Moh hardness of 9) which are both synthetic materials. Suitably mixtures of hard mineral materials with other hard mineral materials or of hard mineral materials with lesser amounts of soft mineral materials may also be employed. (The terms 'hard' and 'soft' are used in this specification to indicate materials having a Mohs scale hardness of at least 7 and less than 7 respectively). For example we have found mixtures of fused alumina and quartz and mixtures of fused alumina with minor proportions of pyrophyllite ($Al_2O_3 \cdot 4SiO_2 \cdot H_2O$) or calcium silicate useful in the preparation of suitable wear-resistant layers.

Irrespective of whether a single 'hard' mineral material or mixtures of such materials or a mixture of a 'hard' mineral material with a 'soft' mineral material is employed to prepare the wear-resistant layer the finely divided mineral having a hardness of at least 7 is preferably present in the wear-resistant layer in such an amount as to comprise from about 6 to about 26 parts by weight of the layer per 100 parts of the resin solids.

The choice of mineral material used is determined by the appearance desired in the finished laminate. Thus if a laminate having a light colour is to be produced it is preferred that the mineral material be colourless and have a refractive index approximating to that of the cured thermosetting resin used; by which means, in conjunction with the substantially transparent overlay sheet, the decorative effect of the laminate is essentially that of the decorative sheet employed. Laminates having a decorative effect that is a result of a combination of the effect of the decorative sheet and the mineral material may be prepared using minerals having a refractive index and/or colour differing from that of the cured resin.

Irrespective of the composition of the mineral matter used it should be present in finely divided form, that is the particles should not be larger than 100 microns. We have found that the wear-resistance of laminates according to our invention increases as the particle size of the hard mineral material increases and that with the increase in particle size there is a correspondingly increasing tendency for the laminate produced therefrom to show crazing and cracking when tested for durability. Also it has been found that with very finely divided mineral materials, of about 2 microns size or below, it is difficult to prepare a uniform composition. We prefer that the particle size of the finely divided mineral material should not be greater than 50 microns and more preferably that the maximum particle size should be about 30 microns with an average particle size of about 25 microns.

The this essential component of the wear-resistant layer is finely divided fibrous natural or regenerated cellulosic material, the average fibre length of which suitably does not exceed 100 microns if an efficient dispersion is to be obtained and is preferably 30 to 50 microns.

The amount of finely divided fibrous cellulosic material present in the wear-resistant layer is preferably from 10 parts to 40 parts by weight per 100 parts of resin solids and more preferably is about 20 parts by weight per 100 parts of resin solids.

The cellulosic material used should be chosen so that its colour and refractive index are compatible with the desired appearance of the product. Thus if a light coloured laminate exhibiting a decorative appearance contributed essentially by the decorative sheet is desired, then a colourless cellulosic material should be chosen with a refractive index approximating to that of the cured resin. Whereas a coloured cellulosic flock will produce a laminate having an appearance contributed to at least in part by the colour of the cellulosic flock.

The thickness of the wear-resistant layer may be varied over a wide range and it is convenient to express the thickness of the layer in terms of its weight per specified area and suitably as grams per square meter (g.s.m.). For applications where very high wear-resistance of the product laminate is required a wear-resistant layer of up to about 120 g.s.m. may be used, whilst when wear-resistance requirements are lower or when thinner laminates are required the layer may be about 20 g.s.m. although we have found beneficial effects on wear-resistance to be obtained with even thinner layers. We prefer that the wear-resistance layer be between about 30 g.s.m. and about 70 g.s.m. as this preferred range confers upon the product laminates a wear resistance that is suitable for the majority of applications.

We have found that the wear-resistant layer of thermosetting resin composition containing finely divided inorganic material and fibrous cellulosic material is preferably provided in the laminate assembly by applying it as a varnish coating to one surface of either or both the thermosetting resin-impregnated decorative sheet or the overlay sheets whilst they are in web form; the impregnated and coated webs, after drying, then being cut to the desired size before being incorporated in the laminate assembly. The surface of the sheet or sheets to which the coating is applied is so chosen that in the finished laminate the wear-resistant layer formed by the coating operation lies between the decorative and overlay sheets.

The impregnating and coating processes may be carried out either as two separate operations in which the web is first impregnated with a thermosetting resin composition and dried before application of the wear-resistant layer composition and subsequent drying, or as a single operation. We prefer to perform the impregnation and coating in the latter manner using a single apparatus; the two steps being performed in such a manner that neither the coating composition as a whole nor any of its constituents penetrated the decorative paper to any substantial extent. In this method of performing the operation, drying is affected once only by passing the treated web, after the coating operation, through a hot air oven.

The impregnation of the decorative and overlay webs is carried out using resin varnishes having compositions known for such use. For example, when employing the preferred melamine formaldehyde resin compositions satisfactory laminates are produced when the resin composition is applied in the form of an approximately 50% resin solids content varnish in a mixed alcohol-water solvent. When impregnating the decorative sheet the amount of resin applied is preferably from about 25% to about 40% based on the weight of resin solids in the impregnated web after drying to a volatile content of between 2% and 6% and is preferably about 4%; whilst when impregnating the overlay paper the amount of resin applied is preferably from about 50% to about 70% and more preferably from about 55% to about 60% based on the weight of resin solids in the impregnated paper after drying to a volatile content of from about 3% to about 8% and preferably from about 4.5% to about 6.5%. Webs prepared having these resin and volatile contents may be cut into sheets that possess the necessary flow characteristics for good bonding to take place in the subsequent heat-pressing operation during which the resin becomes substantially fully cured.

When the laminates of our invention are prepared by the preferred coating technique embodiments, it is necessary for the coating composition employed to be of such a nature and consistency that it may be satisfactorily applied to the impregnated webs in a uniform and controlled manner by the apparatus used. In addition to the essential components of the wear-resistant layer described above dyes and pigments may be included in the coating composition. The coating composition may also include a penetration control additive, which serves to aid the fibrous flock in limiting the extent to which the resinous constituent of the composition penetrates the impregnated web to which the composition is applied. The inclusion of such an additive has also been found to improve the wear-resistance of the laminate for a given coating weight. Examples of the preferred additives are the soluble alginates, notably sodium alginate, in an amount of 0.1% to 2% and preferably 0.2% to 1.2% of the total weight of the coating composition.

The impregnation and coating of the decorative and/or overlay webs may be carried out using any form of apparatus known for such use. After impregnation and/or coating, the treated webs are dried in any suitable known manner and then cut into sheets of the desired size. The treated sheets are then arranged in desired relationship with one or a plurality of resin treated core sheets to form a superimposed assembly which is consolidated by heat and pressure to a unitary laminate.

The consolidation of the assembly to a unitary laminate is preferably carried out with the aid of highly polished press plates optionally with the aid of release sheets or agents, using processes and apparatus known for the production of conventional decorative laminates. The temperature, pressure and press cycle used for the consolidation being those known in the art for preparing conventional decorative plastics laminates comprising those resins used in the product and process of our invention. The laminates so produced may be utilised having a surface corresponding to that of the press-plate or they may first be submitted to a mechanical abrading process, during the course of which, part of the resin impregnating the overlay sheet and possibly also part of the overlay sheet, is removed uniformly reducing the gloss of the surface thereby. When the laminates of our invention are submitted to such mechanical gloss reducing operations, mottle-free surfaces having a uniform appearance of reduced gloss are produced in a satisfactory and economical manner.

In order that our invention may be more clearly understood it is further illustrated by the following Examples, wherein the parts and proportions are by weight.

EXAMPLE 1

100 parts of a spray dried melamine-formaldehyde resin having a melamine to formaldehyde mole ratio of 2:1 were dissolved in 100 parts of deionised water. Whilst the solution was being agitated 1.85 parts of sodium alginate supplied by Alginate Industries Ltd. as "Manucol SX/EH" was added. Agitation was continued until complete solution of the sodium alginate had been achieved and maintained whilst 20 parts of cellulose flock (average fibre length : 50 microns) supplied by Brown Co. (U.S.A.) as "Solka-Floc BW200" and 10 parts of quartz (average particle size : 26 microns; Mohs Scale Hardness : 7) supplied by Croxton and Garry Ltd. as "Garoquarz CML/2" were added to the solution ("Manucal," "Solka-Floc" and "Garoquarz" are Registered Trade Marks).

A web of high quality decorative laminating paper printed in a natural teak pattern and having a basis weight of 130 g.s.m. was passed through a known impregnating and coating apparatus. The first part of the apparatus was adjusted so that sufficient of the same melamine-formaldehyde resin as used to prepare the coating composition was applied, as a 50% resin varnish in alcohol and water, to give a resin content on the impregnated and dried paper of 29%. When the adjustment had been satisfactorily carried out, coating of the impregnated paper with the resin composition prepared in the manner described above was commenced. The coating section of the apparatus was adjusted so as to give a dry coating weight of 68 g.s.m. based on the weight of the dried impregnated paper. After leaving the impregnating and coating apparatus the web was conveyed to a hot air drying oven and passed therethrough at 2 feet per minute with an air temperature of 110°C so that the web leaving the oven had a volatile content of 5.5% and was dry to the touch.

Sheets of the desired size were cut from this treated web and immediately before laminating were dried to a volatile content of 4.2%.

The overlay sheet was prepared in a known manner by impregnating a web of wet-strengthened alpha-cellulose paper having a substance weight of 25 g.s.m. with the same melamine-formaldehyde varnish as used to impregnate the decorative web and then drying the web. The amount of resin applied was sufficient to give a resin content on the impregnated web of 58% after drying at 110°C to a volatile content of 5.5%. A sheet of the desired size was cut from the dried treated web.

The core sheets were prepared in a known manner by impregnating and then drying a web of natural furnish Kraft paper having a basis weight of 210 g.s.m. with a 55% phenol-formaldehyde resole solution. Sufficient resin was applied to give a resin content on the impregnated paper of 30% after drying to a volatile content of 8%. Sheets of the desired size were cut from the dried impregnated web.

A laminate stack was then prepared by assembling in superimposed relationship: 5 impregnated core sheets, an impregnated and coated decorative sheet with the coated surface being distant from the core sheets and a resin impregnated overlay sheet, prepared as described above.

The assembly was then pressed to a unitary structure using glossy press-plates in a conventional laminating press at a temperature rising to 150°C and at a pressure of 1400 psi. After cooling in the press to 60°C the laminate was removed and passed to a mechanical abrading process. The abraded laminate had a uniform appearance of low gloss and the wear-resistance of samples cut from the laminate and tested in accordance with British Standard 3794:1964 showed a mean value of 685 revolutions.

Samples of a laminate prepared as above but omitting the resin-impregnated alpha-cellulose overlay sheet showed a mottled appearance when subjected to the mechanical abrading process and a wear-resistance of 380 revolutions whilst samples of a laminate prepared using an impregnated decorative sheet and an impregnated overlay as above but omitting the coating process showed a wear-resistance of 200 revolutions.

EXAMPLE 2

100 parts of a spray dried melamine-formaldehyde resin having a melamine to formaldehyde mole ratio of 2:1 were dissolved in 100 parts of deionised water and whilst the solution was being agitated 1.6 parts of sodium alginate ("Manucol SX/EH") was added. Agitation was continued until complete solution of the sodium alginate had been obtained and was maintained whilst 10 parts of cellulose flock ("Solka-Floc BW200") and 15 parts of finely divided fused alumina (having a particle size range from about 10 microns to about 30 microns) were dispersed in the solution.

A web of 40 g.s.m. basis weight alpha-cellulose overlay paper was coated on one side only using the above composition and the treated web dried as in Example 1 to a volatile content of 5.0%. The amount of resin composition applied was such as to give a wear-resistant layer of 40 g.s.m. on the surface of the overlay sheet.

The dried and coated overlay was then impregnated with the same resin as used to prepare the coating composition, applied as a 50% solution in an aqueous alcohol solvent. The amount of resin applied to the web in the impregnation step was such that after drying the coated and impregnated web to a volatile content of 5.5% the total weight of impregnating resin and coating composition applied to the paper was 70% of the finished weight.

A sheet was cut from the coated and impregnated web prepared as described and assembled with the coated surface down as the uppermost sheet of an assembly comprising a Natural Teak pattern paper sheet impregnated with melamine-formaldehyde resin varnish to a resin content of 40% based on the dried weight and 5 phenol-formaldehyde resin impregnated core sheets prepared as in Example 1. The assembly was then consolidated to a unitary laminate using the conditions employed in Example 1.

The prepared laminate had a high gloss surface corresponding to the press-plate used and after submitting to a mechanical abrading process the abraded laminate had a mottle-free appearance of uniformly reduced gloss and the wear-resistance of samples cut therefrom when tested in accordance with British Standard 3794:1964 showed a mean value of 545 revolutions.

I claim:

1. A wear-resistant decorative plastics laminate, being the consolidated cured unitary structure obtained by the application of heat and pressure to a superimposed assembly consisting essentially of, in this order, (1) a core of thermosetting resin-impregnated fibrous sheets, (2) a coloured or printed decorative fibrous sheet impregnated with a thermosetting resin, (3) a wear-resistant layer consisting essentially of a thermosetting resin composition, a finely divided water-insoluble mineral matter having a hardness of at least 7 on the Moh's scale of hardness and a finely divided fibrous cellulosic material and (4), as an outermost lamina, an overlay sheet consisting essentially of an alpha-cellulose paper impregnated with a thermosettable resin.

2. A laminate as claimed in claim 1 wherein said wear resistant layer consists essentially of from about 6 to about 26 parts by weight of said finely divided water-insoluble mineral matter and from about 10 to about 40 parts by weight of said finely divided fibrous cellulosic material per 100 parts by weight of the thermosetting resin solids.

3. A laminate as claimed in claim 1 wherein said fibrous sheets are paper sheets.

4. A laminate as claimed in claim 1 wherein said thermosetting resin used to treat said core sheets is a phenol-formaldehyde resin.

5. A laminate as claimed in claim 1 wherein the thermosetting resin of said wear-resistant layer is of the same chemical nature as that used to impregnate both said decorative sheet and said overlay sheet.

6. A laminate as claimed in claim 5 wherein said thermosetting resins are melamine-formaldehyde resins.

7. A laminate as claimed in claim 1 wherein the particle size of said finely divided water-insoluble mineral matter is not greater than 50 microns.

8. A laminate as claimed in claim 1 wherein the maximum particle size of said finely divided water-insoluble mineral matter is about 30 microns and the average particle size is about 25 microns.

9. A laminate as claimed in claim 1 wherein said wear-resistant layer comprises finely divided cellulosic material having an average particle size range of about 30 microns to about 50 microns.

10. A laminate as claimed in claim 1 wherein said wear-resistant layer comprises also a penetration control additive.

11. A laminate as claimed in claim 10 wherein said penetration control additive is sodium alginate.

12. A laminate as claimed in claim 1 wherein said finely divided water-insoluble mineral matter consists essentially of a plurality of finely divided water-insoluble mineral materials each having a hardness of at least 7 on the Mohs' scale of hardness.

13. A laminate as claimed in claim 1 wherein said wear-resistant layer also comprises a finely divided water-insoluble mineral material having a hardness of less than 7 on the Mohs' scale.

* * * * *